United States Patent [19]

MacDoran

[11] 4,215,345
[45] Jul. 29, 1980

[54] INTERFEROMETRIC LOCATING SYSTEM

[76] Inventor: Robert A. Frosch, Administrator of the National Aeronautics and Space Administration, with respect to an invention of Peter F. MacDoran, Pasadena, Calif.

[21] Appl. No.: 938,581

[22] Filed: Aug. 31, 1978

[51] Int. Cl.$^2$ .............................................. G01S 3/02
[52] U.S. Cl. .............................................. 343/112 R
[58] Field of Search .................................... 343/112 R

[56] References Cited

U.S. PATENT DOCUMENTS

| | | | |
|---|---|---|---|
| 2,940,076 | 6/1960 | Bissett et al. | 343/112 R |
| 2,962,714 | 11/1960 | Meixell et al. | 343/112 R X |
| 3,137,854 | 6/1964 | Anderson | 343/112 R |
| 3,249,911 | 5/1966 | Gustafsson | 343/112 R X |
| 3,793,635 | 2/1974 | Potter | 343/112 R |

Primary Examiner—T. H. Tubbesing

Attorney, Agent, or Firm—Monte F. Mott; John R. Manning; Paul F. McCaul

[57] ABSTRACT

A system for determining the position of a vehicle or other target that emits radio waves, which is of the type that senses the difference in time of arrival at spaced ground stations of signals from the vehicle to locate the vehicle on a set of intersecting hyperbolas. A network of four ground stations detects the radio emissions from the vehicle, and by means of cross correlation derives the relative signal delay at the ground stations from which the vehicle position is deduced. Because the signal detection is by cross correlation, no knowledge of the emission is needed, which makes even unintentional radio noise emissions usable as a locator beacon. By positioning one of the four ground stations at an elevation significantly above the plane of the other three stations, a three dimensional fix on the vehicle is possible.

8 Claims, 9 Drawing Figures

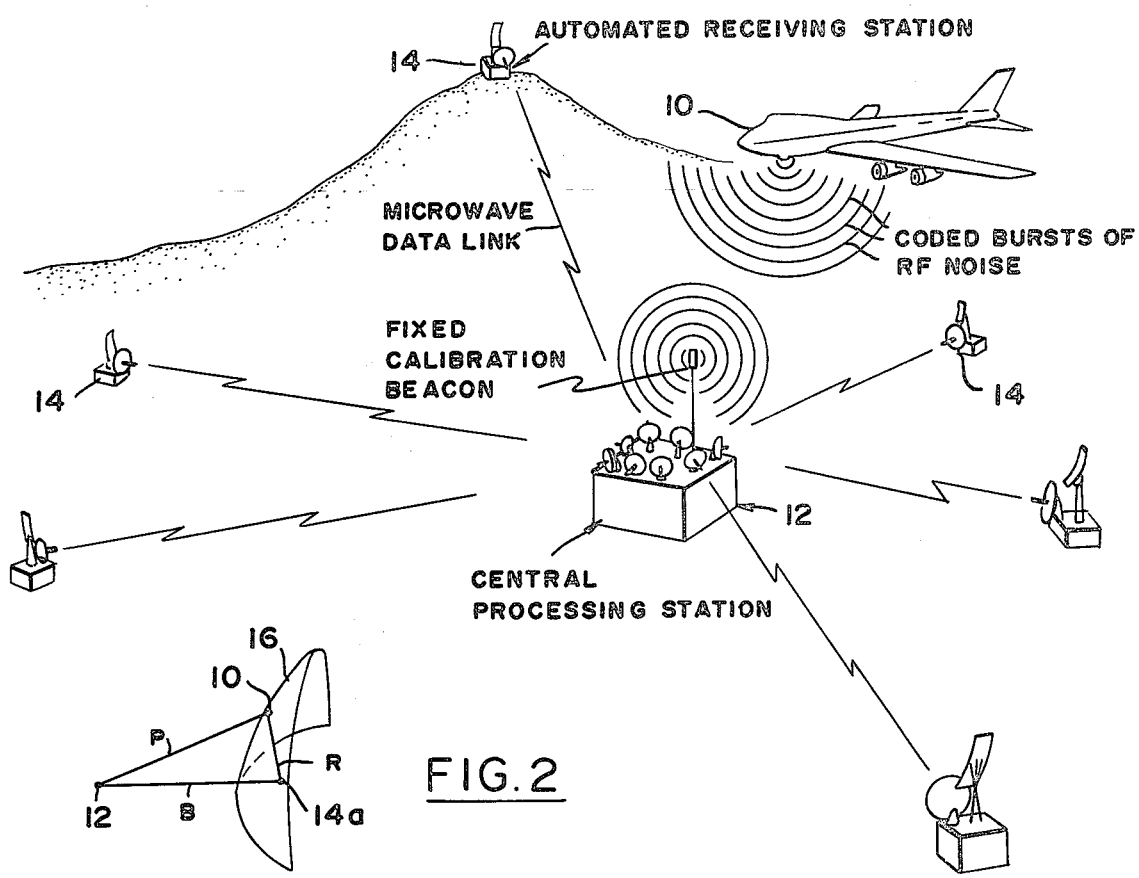
FIG. 1
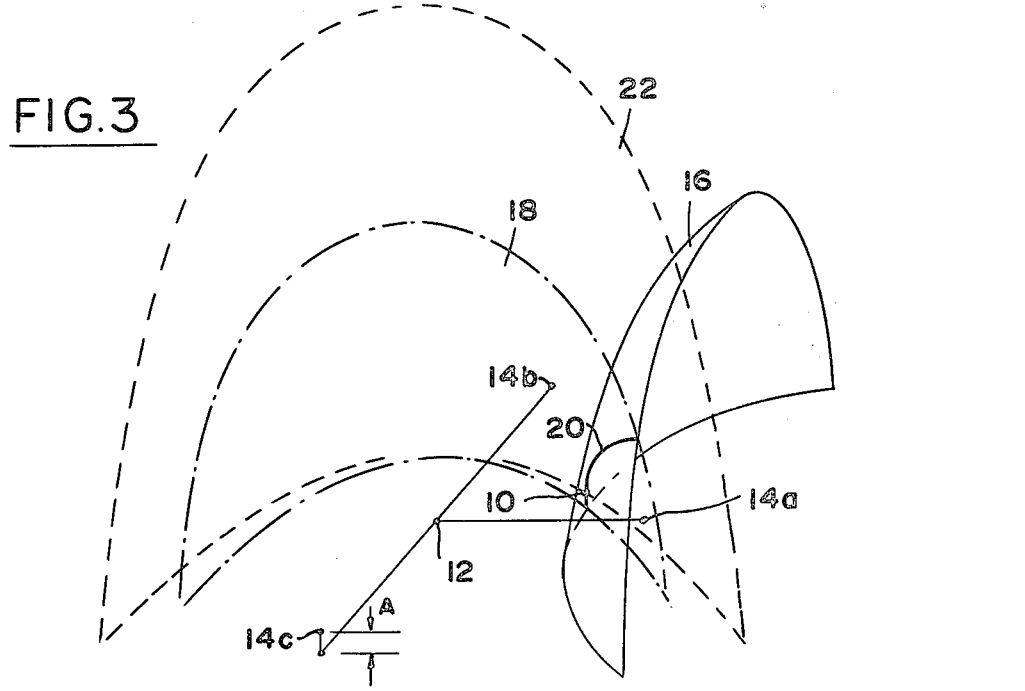
FIG. 2
FIG. 3

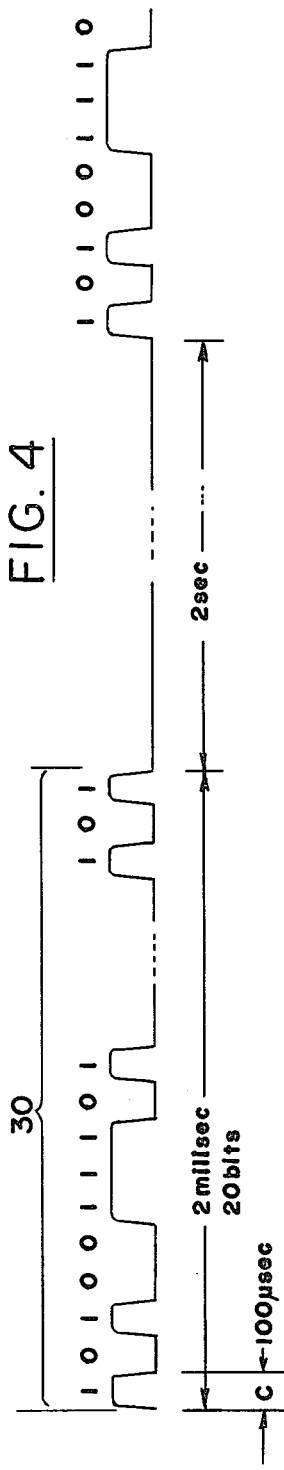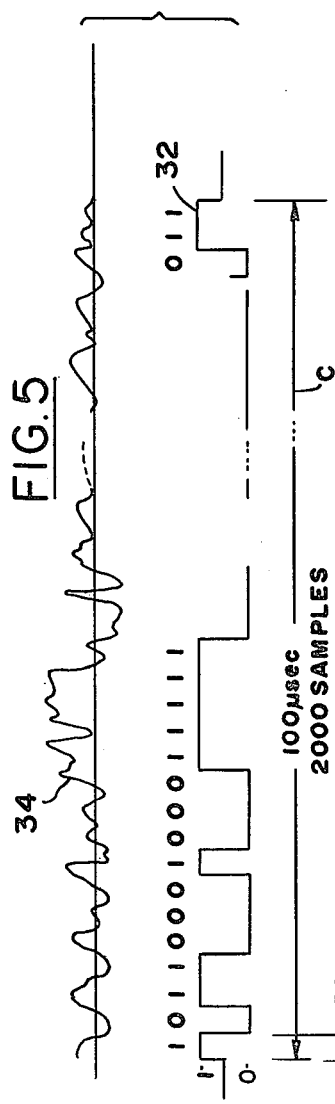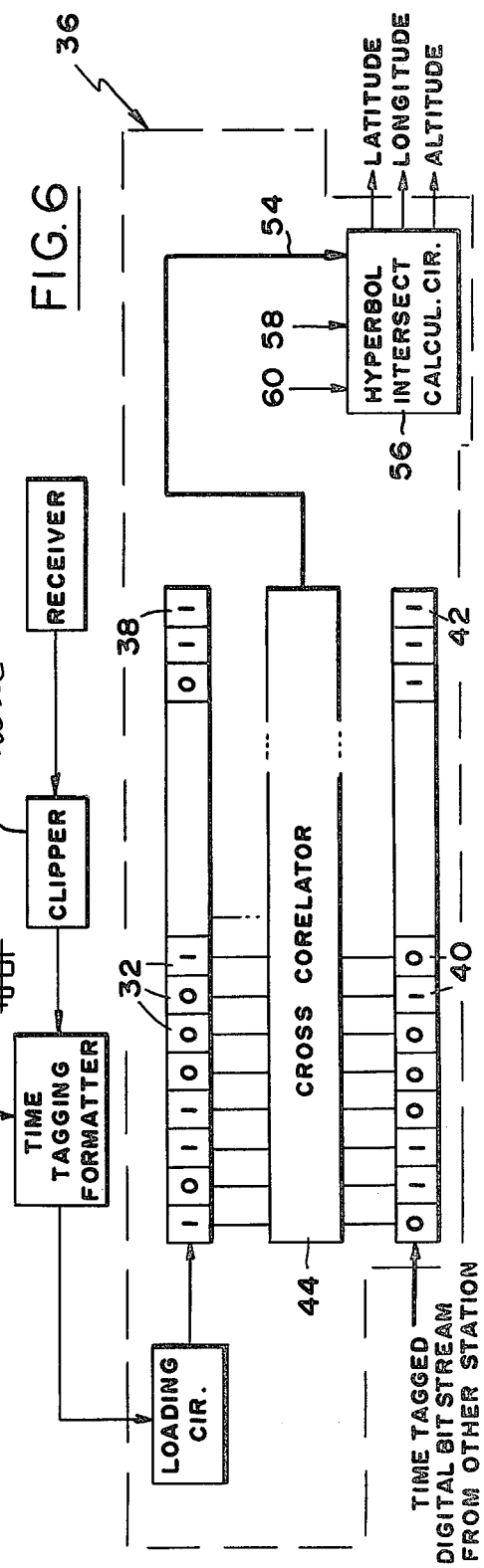

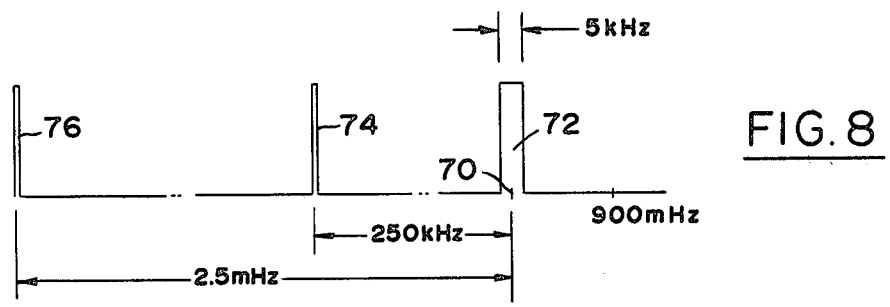
FIG. 8
FIG. 7
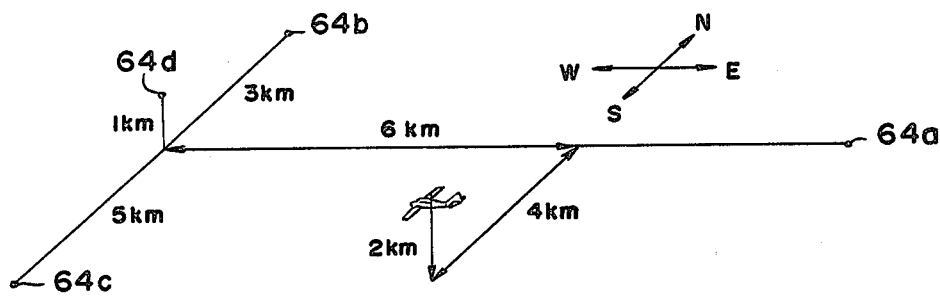
FIG. 9
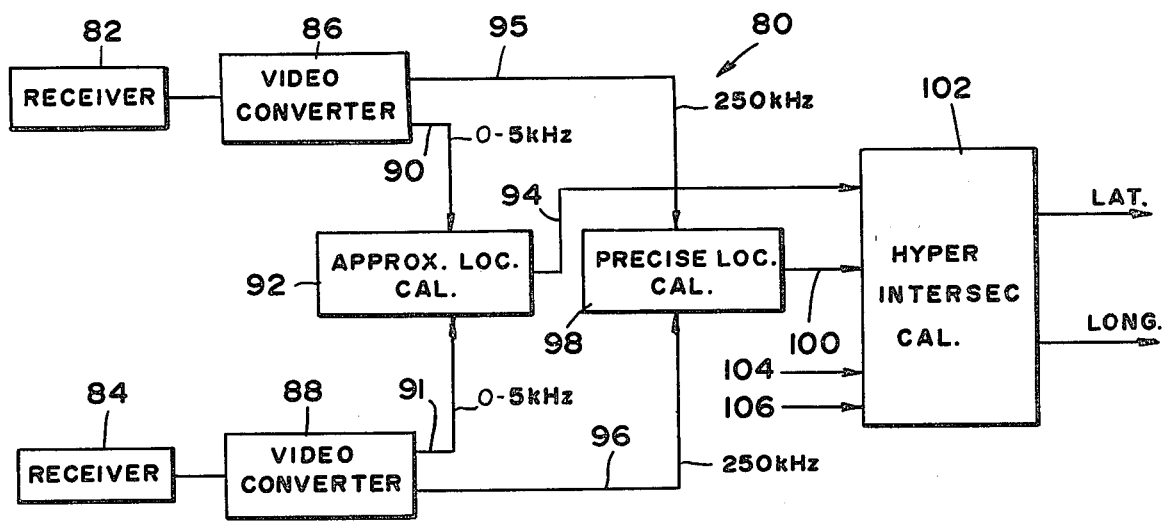

INTERFEROMETRIC LOCATING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

A variety of surveillance systems have been proposed for detecting vehicles, particularly aircraft. The most commonly utilized systems employ radar, which has the disadvantages of normally not providing accurate altitude information, being subject to defeat by counter measure techniques, being subject to attacks by radar homing devices, and providing no locatability of radio sources such as lightning bolts that do not originate from solid objects.

Several lower cost surveillance systems have been proposed which require high quality transmitters in aircraft for transmitting code modulated carrier waves. The carrier waves are detected at spaced ground stations, and the phase difference of the signal at an instant when it is detected by two stations indicates the difference in distance from the vehicle to each of the stations. This difference in distance defines a hyperbola. By utilizing two pairs of stations, two hyperbolic curves are defined, whose intersection is the location of the vehicle. These techniques have the disadvantage that they require at least moderately priced equipment in the aircraft, are not usable for detecting non-cooperating vehicles without such transmitters, and have not been useful in determining the altitude of vehicles.

There is a need for air space surveillance systems which do not have the limitations of existing radar systems, and which could complement existing radar systems or be compatible in operation with them. Ideally, such a surveillance system should be passive and three-dimensional. Additionally, such a system should not be subject to defeat by usual radar countermeasures.

SUMMARY OF THE INVENTION

In accordance with the present invention, a locating system is provided for determining the location of a vehicle by independent station radio interferometry combines with cross-correlation signal detection, which is based upon the detection of broadband electromagnetic radiation received from the vehicle, using receivers displaced from each other at known geographical positions with at least one at a significantly different elevation than the others. Precise time-formatted radio signal receptions from each station are transmitted to a central site where they are cross-correlated to determine the difference in time of arrival from the vehicle to all possible station pairs, to thereby locate the vehicle on hyperboloids of revolution whose intersection is a point which defines the latitude, longitude and height of the vehicle.

Each station can utilize a broad beam antenna to receive the broadband signals, time tag them according to independently operated clocks at each station, and relay the time-tagged signals to a central station. The central station cross-correlates all incoming data streams to establish differences of time of arrival of the signals at the various stations. Where many aircraft of the general aviation type are to be located, each aircraft can carry a relatively low cost transmitter, which emits broadband signals gated on and off so as to identify that aircraft, as by defining the tail number of the aircraft. Each of the pulses of the train can include a substantially white noise signal, and with the white noise signal received at the different stations being cross correlated to determine the location of each aircraft.

The novel features of the invention are set forth with particularity in the appended claims. The invention will be best understood from the following description when read in conjunction with the accompanying drawings.

BRIEF DESCRIPTION OF THE DRAWINGS

FIG. 1 is a conceptual schematic diagram showing a group of stations utilized for detecting the location of an aircraft.

FIG. 2 is a conceptual drawing showing a portion of a hyperboloid of revolution defined by the difference in time of arrival of signals at a pair of spaced stations.

FIG. 3 is a conceptual view of a vehicle locating system, showing how a vehicle is located by the intersection of three hyperboloids of revolution generated by four receiving stations.

FIG. 4 is an illustration of a signal which can be generated by a vehicle located in the diagram of FIG. 3.

FIG. 5 is an expanded illustration of a portion of the signal of FIG. 4.

FIG. 6 is a partial simplified schematic diagram of a cross correlation system which determines the location of a vehicle by the cross-correlation of signals of the type shown in FIG. 5.

FIG. 7 is a conceptual diagram showing one example of a target location.

FIG. 8 is a representation of a frequency spectrum utilized in accordance with a system of another embodiment of the invention.

FIG. 9 is a simplified block diagram of a surveillance system which utilizes the type of radio wave spectrum shown in FIG. 8 to locate a target.

DESCRIPTION OF THE PREFERRED EMBODIMENTS

FIG. 1 shows an overall arrangement of the surveillance system, which can locate a target 10 that emits radio waves. The system includes a central processing station 12 and a plurality of automated receiving stations 14. Radio frequency signals are received by broad beamed antennas at the stations 12, 14 that are connected through microwave links to central site 12. The central station 12 can calculate the position of the target 10 based upon the time of arrival differences of the same radio signals at a plurality of the stations 12 and 14. This is accomplished by the fact that the difference in time of arrival of a signal from the target 10 at two stations 12, 14a as shown in FIG. 2, defines a hyperbolic surface of revolution 16 on which the target is located. That is, the difference in time of arrival of the signal at the two stations 12, 14a and knowledge as to the base line difference B between the stations, generates points located on the hyperboloid of revolution wherein each point is a distance R from one station 14a and a different distance P from the other station 12, and wherein P minus R equals the difference of time of arrival of the signal at the two stations times the speed of light. The actual position of a target 10 can be determined by detecting the emitted signal at three independent pairs of locations, to define three hyperboloids of revolution, and by calculating the intersection of the three hyperboloids of revolution.

FIG. 3 illustrates the manner in which the location of a target 10 can be determined by detecting the difference of time of arrival of a signal from the target at each of four stations 12, 14a, 14b, and 14c. As discussed above, the difference in time of arrival of a signal at the two stations 12, 14a, locates the target on a hyperbola which is a surface of a hyperboloid of revolution 16. Detecting the difference in time of arrival at another pair of stations 14b, 12 defines a second hyperboloid of revolution 18. The intersection of the two hyperboloids of revolution 16, 18 is a curved line 20. Thus, the target can be located along a line 20 by detecting the difference in time of arrival of signals from the target 10 at two pairs of stations. In order to determine the location of the target 10 along the line 20, the signal from target 10 is detected at a third pair of stations 14c, 12. This defines a third hyperboloid of revolution 22 that intersects the line 20 at the point 10 where the target is located. Thus, by detecting the signal from the target 10 at three pairs of spaced stations, the actual location of the target 10 in three dimensions, can be determined.

In order to accurately locate a target 10 such as an aircraft flying at moderate altitude, within an air space in and near a large city, the receiving stations 12, 14 should be spaced a considerable distance apart such as 20 miles apart. If all of the stations 12, 14 were at approximately the same altitude, then the hyperboloids of revolution 16, 18, 22 would all extend in a largely vertical direction at that altitude. For example, with the three stations 14a, 14b, 12 all at about ground level, the line 20 representing the intersection of the hyperboloids of revolution 16, 18 extends nearly vertically near ground level. If the fourth station 14c were also at ground level, then the hyperboloid of revolution 22 would also extend nearly vertically at the target 10, and it would be difficult to precisely determine the altitude at which the hyperboloid of revolution 22 intersected the line 20. To avoid this, one of the stations 14c is positioned at a considerably different altitude A than the other stations 14a, 14b, 12. As a result, the hyperboloid of revolution 22 defined by the station 14c and another 12 is not so closely parallel to the line 20 at its intersection with the line, and therefore the altitude of the target 10 can be determined with a reasonable degree of accuracy. For stations spaced perhaps 20 miles apart, an altitude A of about one mile of one station 14c above or below the altitude of one or more of the other stations is sufficient to enable a fair degree of accuracy in determining the altitude of the target.

In one surveillance system for locating any of a group of general aviation type aircraft in an area near a city, each of the aircraft to be located carries a radio transmitter. The transmitter of each aircraft is of a relatively low cost type, whose function is primarily to deliver ungated noise signals rather than a controlled sinusoidal carrier wave or the like. In one example, each aircraft transmitter is designed to deliver a 20-bit binary code which represents the "tail member" of that aircraft. FIG. 4 illustrates a portion of a typical transmission from an aircraft, which transmits a train of pulses identifying the aircraft. Each train of pulses, indicated at 30, comprises 20 bits of information representing the number of the aircraft. Each binary "1" is represented by a pulse, while each binary "0" is represented by the absence of a pulse. Each pulse lasts for a period C of 100 microseconds, so that the series of twenty pulses during the period 30 lasts for a period of two milliseconds. The aircraft transmitter is designed so that whenever it is turned on, it transmits the 20-bit sequence at a random time of RMS separations of two seconds with no transmission being broadcast in between the 20-bit train of pulses. The surveillance system utilizes the noise characteristic of each pulse to determine the difference of times of arrival from all pairs of receiving stations by cross-correlation techniques and then uses the presence or absence of cross-correlation signals to decode the aircraft identification given by the 20-bit pulse sequence.

FIG. 5 indicates the manner in which one pulse of duration C of 100 microseconds is cross correlated to generate a code 32 which can be used to identify the presence of a common signal at each station. The summation of all 2000 pairs of sampled signals at 50 nanosecond spacings of codes generated at two different stations, provides the basis for deciding if a common signal has arrived at both stations. For example, if the result is 2000, then perfect correlation exists. If the result is 10 or less; there is no common signal. If the result is 100 or more, the system may decide that a common signal is present. The amount of delay of one digital bit stream from one station relative to another station, gives the difference of arrival time.

FIG. 6 illustrates the nature of a circuit 36 that can be utilized to receive the vehicle radio emissions. Each station includes a receiver, a clipper 37 for generating the code 32, and a time tagging formatter for encoding the time of all signal receptions at that station. At each station, there is no way of determining whether any signals of interest have actually arrived. The detection of the signals of interest are done by cross-correlation between pairs of stations. Digital data streams of the time tagged received signals are then delivered to the circuit 36 at a central station. The circuit 36 includes a first register 38 which holds the bit stream from a station. A corresponding bit stream received from another station is held in another register 42. A computer 44 acts as a cross correlator to compare the signals in the two registers 38, 42 to determine the degree of correspondence of the signals.

The computer 44 is programmed to determine the amount by which one signal such as 40 must be shifted to achieve a high correlation with the other signal 32. The shift can indicate the difference in time of arrival of the signals at two corresponding stations. For example, assuming the delay between the time the signals are received at each of two stations and the time the signals are entered in the registers 38, 42 are equal, then if the signal 40 is nearly identical with signal 32 after a shift of signal 40 of ten digits, with the digits spaced 50 nanoseconds apart as indicated in FIG. 5, then this indicates a difference in time of arrival at the two stations, of the signals emitted by the target, of 500 nanoseconds (indicating the target is 150 meters further from one station than the other). The actual computed time difference is adjusted by the difference in time tagging of the two codes 32, 34. A computer output on line 54 which indicates the time difference, is delivered to another computer or calculating circuit 56. Two additional circuits can be provided to generate counts that are delivered over lines 58 and 60 to the calculating circuit 56, to provide three counts representing three time differences. These three counts can, for example, represent the difference in distance from the target 10 of FIG. 3 to a first pair of stations 12, 14a, a second pair of stations 12, 14b, and a third pair of stations 12, 14c. The circuit 56 utilizes the counts representing the differences in distances to calculate the intersection of three hyperboloids of revolution represented by the counts. With the longitude, latitude, and elevation of each of the four stations 12, 14a, 14b and 14c known, the longitude, latitude, and elevation of the target 10 can be determined.

The circuit 56 can determine the location of the target by calculating the range difference between some initial assumed target position and the monitoring stations, comparing the resultant range differences with the observed range differences, and iteratively choosing new starting positions until the observed minus calculated range differences are negligible, Of course the range difference equals the difference in time of arrival of a signal at two stations, times the speed of light. This iterative method is a common technique employed for the digital computer solution of mathematical problems.

As mentioned above, in implementing a real surveillance system of the described type, it is normally necessary to time tag each of the code signals 32, since the time of transmission from one of the auxiliary stations 14 to the central station 12 is substantial compared to the difference in time of arrival of the aircraft emission at the stations. The synchronization of the receiving stations to the few nanosecond level can be achieved by the use of a calibration beacon at a known position and visible to all receiving stations (such as a beacon at station 12 in FIG. 1). Since the positions of the receiving stations and fixed calibration beacon are known, the station clock times can be adjusted so as to yield the known beacon position in the simultaneous solution using the difference of arrival measurements. It may also be noted that a variety of other cross correlation circuits have been proposed for locating a source of radio waves by computing the intersection of a pair of hyperbolas, such as that shown in U.S. Pat. No. 2,940,076.

The utilization of an aircraft radio transmitter whose signal is received at pairs of spaced stations, to determine the difference in time of arrival at the two stations, so as to generate intersecting hyperbolas, has been previously known. However, prior systems have required that the aircraft transmitter transmit a well understood sinusoidal wave that was appropriately modulated. The difference in time arrival of this particular radio waveform at ground stations can be accurately determined by measuring the difference in phase of such signals at each station at a given instant, and prior art systems have depended upon this phenomenon. However, the requirement that particular waveforms be transmitted requires that relatively more expensive equipment be carried by the aircraft, which may be suitable for commercial aviation, but which is much more difficult to achieve with general aviation where the cost of the avionics is very important.

By cross correlating high frequency noise signals, instead of trying to determine the phase difference of modulated sinusoidal carrier signals, the present invention enables the locating of a target such as an aircraft, by utilizing less expensive equipment on the vehicle. Essentially, the sophistication of the system is shifted to the ground so that a somewhat more complicated ground implementation will enable a much less complicated vehicle-carried circuitry to be utilized. Also, prior art systems have utilized stations all at about ground level, to determine only the azimuth and range of an aircraft and only crudely its altitude. This resulted in the need for the aircraft to carry a precision altimeter which telemetered its reading to the ground, or for the pilot to communicate his altitude via voice to the central ground station, in order for the ground station to determine the altitude of the aircraft. By locating one ground station at a much greater altitude than the others, the present invention enables the ground stations to directly determine the altitude of the aircraft. Of course, this cross correlation signal detecting system can be used with only two pairs of stations to determine the intersection of hyperbolas of the two-dimensional kind which are lines, instead of the intersection of three three-dimensional hyperbolas of the hyperboloid of revolution kind.

With a beacon that emits signals of the type shown in FIG. 4, with each train of pulses 30, lasting about 2 milliseconds, and with the trains of pulses spaced about two seconds apart, it is possible to detect each of perhaps 100 different aircraft flying in the region, even though each of the aircraft transmitters is not synchronized to the other so as to prevent two aircraft from transmitting at the same time. During each two second period, there are 1,000 intervals of two milliseconds each, and even though two aircraft may occasionally overlap their transmissions, it is very unlikely that the same two aircraft will again transmit overlapping signals during the successive few minutes. The transmitters on the aircraft have gated transmissions which are initiated by a digital random sequence generator whose RMS time to on condition is about two seconds with each pulse of the train being made up of wideband RF signals. It is desirable for the train of pulses to last for a small fraction of a second, and that the rest period between the broadcast of successive trains of pulses be at least one hundred times the duration of each train. Also, the quiet period of the transmissions by different aircraft should also be randomly varied to avoid systematic interference between the same two aircraft.

The present system which cross correlates high frequency broadband radio noise from a target, rather than sinusoidal or other structured waveforms has advantages not only in the voluntary detection of cooperative aircraft, but also in a number of other applications. For example, atmospheric disturbances such as lightning which generate electromagnetic noise signals, can be located by the system of the invention, by operating the system to determine the location of a noise source. In a similar manner, a target such as a radar emitting hostile missile, can be located by cross correlation of noise signals received therefrom, which the target emits for jamming purposes. The locating system can repeatedly determine the position of the strongest noise source in the vicinity, and steerable and more directional antennas can be utilized to block out unwanted signals.

In one system which has been designed, in accordance with the layout shown in FIG. 7, four stations are utilized, with the stations 64a, 64b, and 64c spaced at various distances from a central station 64d, with station 64a spaced 10 Km east, 64b spaced 3 Km north and 64c spaced 5 Km south of station 64d. Station 64d is at an elevation of one kilometer from the plane of the other three stations. With 10 MHz bandwidth radio signals received from a target, encoded as shown for code 32 of FIG. 5, wherein the received binary bits are spaced 50 nanoseconds apart, a horizontal accuracy (longitude and latitude) of less than one meter can be obtained in locating the target. A vertical accuracy of about 15 meters can be obtained for targets of a height of a few kilometers. As one example, assuming that station 64d detects the target 4.33 microseconds after station 64a (so that the difference in distance from the target to the stations is 1,300 meters), station 64d detects the emissions 7 microseconds ahead of station 64b (so the difference in distance is 2,100 meters), and the station 64d detects the emissions 3 microseconds after station 64c (so the difference in distance is 900 meters). The simultaneous iterative numerical solution would place the target 10 at a location approximately 6,000 meters east, 4,000 meters south, and 2,000 meters above the plane defined by stations 64a, 64b and 64c.

Thus, the invention provides a method and apparatus for locating a target which emits broadband radio signal bursts which can be utilized to locate a wide variety of targets, including those which have relatively low cost crude beacons, and even those which are natural or hostile noise sources. This can be accomplished by cross correlating noise-like signals received at a plurality of spaced receiving stations, and locating the target at the intersection of a plurality of hyperboloids. Although only two baselines (3 stations) are needed to locate the target in two dimensions, it is also possible to determine the altitude of the target by the addition of a fourth receiving station positioned at a significantly different altitude than the others, such as by 10% of the maximum altitude of aircraft to be located in altitude (e.g. 2 Km for station 64d for aircraft at up to 20 Km altitude).

In many situations, it is desirable to accurately locate a target such as each aircraft in the area, and yet accomplish this using a closely limited bandwidth of vehicle transmissions. For example, accurate vehicle location permits calculation of the speed and direction of an aircraft, by detecting its location at two closely spaced times. However, the crowding of airwaves especially near large cities, often makes it necessary to limit the bandwidth of transmission of each aircraft, so that it may not be permissible in many areas, for large numbers of aircraft to generate identifying pulse trains containing broad band signals. The transmission for each aircraft can be limited to a narrow band such as a 5 kHz voice band at an appropriate frequency such as 900 MHz, over which a train of pulses of the type shown in FIG. 4 can be transmitted, except that each pulse train would have a much longer duration and the noise frequencies would be limited to perhaps the 5 kHz band. Alternatively, the system could utilize the equivalent of noise in a voice transmission to calculate the location of the vehicle. If a large number of vehicles must be detected, then many of such 5 kHz channels must be provided, and the pilot of each vehicle may have to wait until a channel is clear before broadcasting.

While the above use of limited bandwidths of perhaps 5 kHz each enables target location, the location will not be known with great accuracy. For example, a 5 kHz sine wave has a length of $60 \times 10^3$ meters. Assuming that the phase difference between two waves can be determined within 1% of the wavelength, this would give an accuracy of vehicle location of 600 meters. Where noise or a pseudorandam pulse transmission must be detected at the different ground stations, this order of accuracy of vehicle location can also be obtained where a strong signal can be detected, but it is not sufficient for accurate vehicle location.

In accordance with another embodiment of the invention, a vehicle transmitter transmits a carrier wave of perhaps 900 MHz which is modulated by a voice channel of perhaps 5 kHz, and which is also modulated by a very narrow band but moderate frequency signal such as one of 250 kHz. FIG. 8 shows the spectrum of the transmission, which includes a carrier wave of a frequency 70 which may, for example, be near 900 MHz, a limited bandwidth channel 72 such as a voice channel of 5 kHz bandwidth for transmitting a train of pulses, noise or a sine wave, and a spur (narrow band transmission) 74 of a moderately high frequency but narrow bandwidth. For a spur 74 of 250 kHz frequency, and therefore of 1200 meters wavelength, and with the use of ground station circuitry which can determine the difference in phase of the received signals at the different ground stations to within 1%, the accuracy of vehicle location can be determined within 1% of 1200 meters, or within 12 meters. Where greater accuracy is required, an additional spur 76 of higher modulation frequency such as 2.5 MHz or 25 MHz can be used in addition to the 250 kHz spur to allow 1.2 m or 0.12 m difference measurement between two ground stations.

Thus, the relatively low frequency modulation of about 5 kHz can be used to determine the general location of an aircraft, that is, within perhaps 600 meters of its actual location. An additional moderate frequency modulation of about 250 kHz can be used to determine the more precise location of the aircraft, such as within 12 meters of its actual location. Of course, if only the 250 kHz spur were used, then the aircraft location would not be known, since the aircraft might be located any multiple of 1200 meters (the wave length of the 250 kHz wave) away from the actual location and still produce the same phase difference at two stations. Thus, the 5 kHz band is necessary to derive the location within 600 m to resolve 1200 m ambiguities in the location derived by the 250 KHz spur. The apparatus of FIG. 6 can be utilized to calculate vehicle location, first on the basis of the 5 kHz transmission, and then on the basis of the 250 kHz spur or additional spurs at 2.5 MHz or 25 MHz as accuracy requirements may dictate.

FIG. 9 illustrates a surveillance system 80 which can calculate the location of a target which broadcasts the spectrum shown in FIG. 8. The high frequency (e.g. 900 MHz) modulated radio wave is received by receivers 82, 84 at two spaced locations. The high frequency signal is demodulated by the video converters, or demodulators 86, 88 at each station. Each demodulator delivers the low frequency modulation component, such as the 0 to 5 kHz band 72, over a line 90 or 91 to an approximate location calculating circuit or computer 92 at a central station, whose output on line 94 indicates the approximate difference in time of arrival of the radio waves at the two stations. Each demodulator 86, 88 also delivers a higher frequency modulation component, such as the 250 kHz spur 74, over a line 95, 96 to a precise location calculating circuit or component 98 at the central station. The output line 100 of the computer indicates the difference in time of arrival of the radio waves at the two stations with greater precision, but with an indefiniteness equal to an integral multiple of the period of each cycle of the higher frequency component. That is, the output on line 100 equals the difference in time of arrival plus an integer times 4 microseconds for the 250 kHz modulation component. The output on lines 94 and 100 are delivered to a hyperbolic intersection calculating circuit 102 which also receives a pair of signals on lines 104, 106 from another pair of circuits representing the difference in time of arrival of the radio waves at another pair of stations. The outputs of the circuit 102 are signals indicating the position of the target such as in latitude and longitude. Of course all of the calculating circuits can comprise a single computer programmed to make the required calculations.

Although particular embodiments in the invention have been described and illustrated herein, it is recognized that modifications and variations may readily occur to those skilled in the art, and consequently, it is intended that the claims be interpreted to cover such modifications and equivalents.

What is claimed is:

1. A method for locating a target that can emit radio waves that aid in its location, comprising:

emitting radio waves from the target;

detecting the same emitted radio waves originating from the target, at a first pair of stations that are spaced apart and located at known geographical positions;

measuring the difference in time of arrival of said waves at said first pair of stations;

detecting the same emitted radio waves originating from said source, at a second pair of stations that are spaced apart and located at known geographical positions;

measuring the difference in time of arrival of said waves at said second pair of stations; and calculating the geographic location of a point which is located a different distance from the two stations of each pair wherein each difference distance is equal to the time difference in wave arrival multiplied by the speed of light; and wherein said step of emitting includes emitting a signal which comprises a radio frequency carrier modulated by an information frequency band of more than a kiloHertz width and a second spur signal comprising an unmodulated signal but of a frequency which is a plurality of times greater than the highest frequency of said information band, whereby to enable a determination of the general sector of target location and the specific target location within the sector using a limited amount of broadcast frequency bandwidth.

2. The method described in claim 1 wherein:

said step of emitting includes emitting a voice signal in a channel of a plurality of kilohertz bandwidth, and emitting a spur signal having a frequency at least ten times the highest frequency in said information band.

3. A surveillance system comprising:

at least three radio receiving stations spaced apart, to form at least two pairs of stations with each pair including two stations, each station including a receiver for detecting a modulated high frequency radio wave;

means for comparing the phase of first modulating signals within a first low frequency modulation band of said high frequency radio wave, and for separately comparing the phase of second modulation signals within a second higher frequency modulation band of said high frequency radio wave, for generating signals representing the difference in time of arrival of the same high frequency radio wave at the two stations of the pair; and means for generating a signal defining the location of a point which is located a different distance from the two stations of each pair, wherein each difference is equal to the time difference in wave arrival multiplied by the speed of light.

4. The system described in claim 3 wherein:

said comparing means comprises means to generate a first difference-indicating signal representing the difference in phase of said first modulating signals whereby to indicate the approximate difference in time of arrival, and to generate a second difference-indicating signal representing the difference in phase of said second modulating signals, whereby to more precisely indicate the difference in time of arrival plus any integral multiple of the duration of one cycle of the second modulating signal; and said generating means comprises means to generate a signal which defines the location of a point which is located a different distance from the two stations of each pair, wherein each difference distance is approximately equal to the time difference indicated by the first difference-indicating signal multiplied by the speed of light, and is more precisely equal to the time difference indicated by the second difference-indicating signal plus an integral multiple of the duration of one cycle of the second modulating signal.

5. A method for locating a target that emits radio waves, comprising:

detecting the same emitted radio waves originating from the target, at a first pair of stations that are spaced apart and located at known geographic positions;

measuring the difference in time of arrival of said waves at said first pair of stations;

detecting the same emitted radio waves originating from said source, at a second pair of stations that are spaced apart and located at known geographic positions;

measuring the difference in time of arrival of said waves at said second pair of stations;

detecting the same emitted radio waves orginating from the target at a third pair of stations that are positioned at widely space altitudes;

measuring the difference in time of arrival of said waves at said third pair of stations;

calculating the geographic location and altitude of a point which is located a different distance from the two stations of each pair wherein each difference distance is equal to the time difference in wave arrival times the speed of light; and wherein said steps of detecting each comprise detecting a train of wideband noise-like signals at each station of the pair, and cross correlating the signals detected by each pair of stations to determine the amount of delay of one train of noise signals relative to the other, at which the trains are matched.

6. A surveillance system comprising:

at least four radio receiving stations spaced apart, to form at least three pairs of stations with each pair including two spaced stations, each station including a receiver for detecting radio waves;

means for comparing the phase of wideband noise-like radio waves received at each pair of signals, for generating a signal representing the difference in time of arrival of the same transmitted radio waves at the two stations of a pair; and means for generating a signal defining the location of the intersection of at least two hyperbolas, wherein the points along each hyperbola are positioned so they are spaced differently from the two stations of a pair by a distance equal to the difference in time of arrival of the same transmitted radio waves at the two stations of a pair times the speed of light;

at least one of said stations being at a significantly different altitude than a plurality of other stations; and said signal generating means generating a signal defining the location in three dimensions of the intersection of three hyperboloids of revolution.

7. A method for locating each of a group of vehicles, comprising:

emitting radio signals from each of a plurality of vehicles;

detecting the same emitted radio waves originating from a vehicle, at a first pair of stations that are spaced apart and located at known geographic positions;

measuring the difference in time of arrival of said waves at said first pair of stations;

detecting the same emitted radio waves orginating from said vehicle, at a second pair of stations that are spaced apart and located at known geographic positions;

measuring the difference in time of arrival of said waves at said second pair of stations; and calculating the geographic location of a point which is located a different distance from the two stations of each pair wherein each difference distance is equal to the time difference in wave arrival times the speed of light; and wherein said steps of detecting each comprise detecting a train of wideband noise-like signals at each station of the pair, and cross correlating the signals detected by each pair of stations to determine the amount of delay of one train of noise signals relative to the other, at which the trains are matched; and said step of emitting includes repeatedly emitting a train of pulses from each of said vehicles wherein each train of pulses from a vehicle defines a number uniquely identifying said vehicle, and wherein each train of pulses has a duration of a small fraction of a second, and successive trains of pulses from each vehicle are spaced apart by a different time period each at least one hundred times longer than the train of pulses from the aircraft, so that systematic interference between pairs of aircraft do not occur.

8. A surveillance system comprising:

a radio transmitter which is constructed to repeatedly generate a train of pulses, with each pulse containing nearly white noise within a limited bandwidth, each train of pulses lasting a fraction of a second, and the train being repeated at intervals spaced apart by a period at least one hundred times longer than the duration of the train;

at least three radio receiving stations spaced apart, to form at least two pairs of stations with each pair including two spaced stations, each station including a receiver for detecting radio waves from said transmitter;

means for comparing the phase of wideband noise-like radio waves received at each pair of signals, for generating a signal representing the difference in time of arrival of the same transmitted radio waves at the two stations of a pair; and means for generating a signal defining the location of the intersection of at least two hyperbolas, wherein the points along each hyperbola are positioned so they are spaced differently from the two stations of a pair by a distance equal to the difference in time of arrival of the same transmitted radio waves at the two stations of a pair times the speed of light.

* * * * *